United States Patent
Wu et al.

(10) Patent No.: US 10,200,228 B2
(45) Date of Patent: Feb. 5, 2019

(54) INTERLEAVER DESIGN FOR DUAL SUB-CARRIER MODULATION IN WLAN

(71) Applicant: MEDIATEK INC., Hsinchu (TW)

(72) Inventors: Tianyu Wu, Fremont, CA (US); Jianhan Liu, San Jose, CA (US); Gary A. Anwyl, Palo Alto, CA (US); Thomas Edward Pare, Jr., Mountain View, CA (US)

(73) Assignee: MEDIATEK INC., Hsin-Chu (TW)

( * ) Notice: Subject to any disclaimer, the term of this patent is extended or adjusted under 35 U.S.C. 154(b) by 60 days.

(21) Appl. No.: 15/381,109

(22) Filed: Dec. 16, 2016

(65) Prior Publication Data
US 2017/0180177 A1    Jun. 22, 2017

Related U.S. Application Data (60) Provisional application No. 62/268,620, filed on Dec. 17, 2015.

(51) Int. Cl.
| | |
|---|---|
| H04L 27/26 | (2006.01) |
| H04L 1/00 | (2006.01) |
| H04L 1/04 | (2006.01) |
| H04L 1/08 | (2006.01) |
| H04W 84/12 | (2009.01) |

(52) U.S. Cl.
CPC ........ *H04L 27/2637* (2013.01); *H04L 1/0071* (2013.01); *H04L 1/04* (2013.01); *H04L 1/08* (2013.01); *H04W 84/12* (2013.01)

(58) Field of Classification Search
CPC ... H04L 27/2637; H04L 1/0071; H04L 84/12; H04L 27/26; H04L 1/00; H04W 84/12
USPC .......................... 370/328–330; 709/221–229
See application file for complete search history.

(56) References Cited

U.S. PATENT DOCUMENTS

| | | |
|---|---|---|
| 7,126,533 B2 | 10/2006 | Fiore et al. |
| 8,213,527 B2 | 7/2012 | Wang et al. |
| 8,619,641 B2 | 12/2013 | Guo |
| 8,929,192 B2 | 1/2015 | Kainulainen et al. |

(Continued)

FOREIGN PATENT DOCUMENTS

| | | |
|---|---|---|
| CN | 102149192 | 8/2011 |
| EP | 3098999 | 11/2016 |

(Continued)

OTHER PUBLICATIONS

Darryn Lowe et al, "Analysis and Evaluation of MB-OFDM Dual Carrier Modulation", Telecommunicatins Information Technology Research Institute, University of Wollongong.

(Continued)

*Primary Examiner* — Man U Phan (57) ABSTRACT

A method of interleaver design for dual carrier modulation (DCM) is proposed in a wireless network. For HE PPDU transmission with DCM, information bits are first encoded by a BCC encoder. The BCC encoded bit streams are then interleaved by a BCC interleaver. More specifically, the BCC interleaved bits are repeated on two halves of a given resource unit (RU). The BCC interleaver parameters are defined based on half of the total number of the data tones of the RU if DCM is applied. The BCC interleaved bits are then modulated and mapped to two halves of the RU by a DCM constellation mapper.

20 Claims, 6 Drawing Sheets

(56) References Cited

U.S. PATENT DOCUMENTS

| | | | |
|---|---|---|---|
| 9,615,214 B2 | 4/2017 | Syrjarinne et al. | |
| 9,647,868 B2 | 5/2017 | Jiao et al. | |
| 2001/0006540 A1 | 7/2001 | Kim et al. | |
| 2006/0158374 A1 | 7/2006 | Rahamin et al. | |
| 2008/0191941 A1 | 8/2008 | Saban et al. | |
| 2008/0232485 A1 | 9/2008 | Niu et al. | |
| 2009/0122890 A1* | 5/2009 | Wu | H04L 27/0008 375/261 |
| 2010/0246720 A1 | 9/2010 | Wang et al. | |
| 2011/0033004 A1* | 2/2011 | Wang | H04L 27/2626 375/261 |
| 2011/0193739 A1* | 8/2011 | Strauch | G01S 7/006 342/146 |
| 2011/0243197 A1 | 10/2011 | Atarashi et al. | |
| 2011/0261858 A1 | 10/2011 | Baldemair et al. | |
| 2011/0274003 A1 | 11/2011 | Pare, Jr. et al. | |
| 2012/0258669 A1 | 10/2012 | Honkanen et al. | |
| 2012/0263211 A1 | 10/2012 | Porat et al. | |
| 2013/0070701 A1 | 3/2013 | Merlin et al. | |
| 2013/0089121 A1* | 4/2013 | Koo | H04L 27/06 375/150 |
| 2013/0265907 A1 | 10/2013 | Kim et al. | |
| 2013/0321209 A1 | 12/2013 | Kalliola et al. | |
| 2013/0343211 A1 | 12/2013 | Liu et al. | |
| 2014/0070996 A1 | 3/2014 | Kneckt et al. | |
| 2014/0219449 A1 | 8/2014 | Shattil et al. | |
| 2014/0254648 A1 | 9/2014 | Van Nee | |
| 2014/0328335 A1 | 11/2014 | Zhang | |
| 2015/0023449 A1 | 1/2015 | Porat et al. | |
| 2015/0124739 A1 | 5/2015 | Baik et al. | |
| 2015/0139091 A1 | 5/2015 | Azizi et al. | |
| 2015/0139115 A1 | 5/2015 | Seok | |
| 2015/0230231 A1 | 8/2015 | Fornoles, Jr. | |
| 2015/0296516 A1 | 10/2015 | Jung | |
| 2016/0021568 A1 | 1/2016 | Yu et al. | |
| 2016/0033614 A1 | 2/2016 | Wang et al. | |
| 2016/0047885 A1 | 2/2016 | Wang et al. | |
| 2016/0065467 A1* | 3/2016 | Wu | H04L 65/60 370/392 |
| 2016/0248542 A1 | 8/2016 | Liu et al. | |
| 2016/0249165 A1 | 8/2016 | Aldana | |
| 2016/0323060 A1* | 11/2016 | Hassanin | H04L 1/0041 |
| 2016/0330055 A1* | 11/2016 | Tong | H04W 84/12 |
| 2016/0352552 A1* | 12/2016 | Liu | H04B 1/7176 |
| 2016/0366548 A1 | 12/2016 | Wang et al. | |
| 2016/0370450 A1 | 12/2016 | Thorn et al. | |
| 2017/0064718 A1 | 3/2017 | Bharadwaj et al. | |
| 2017/0070893 A1 | 3/2017 | Wang et al. | |
| 2017/0070998 A1 | 3/2017 | Wu et al. | |
| 2017/0093546 A1 | 3/2017 | Wu et al. | |
| 2017/0099089 A1 | 4/2017 | Liu et al. | |
| 2017/0104553 A1 | 4/2017 | Liu et al. | |
| 2017/0134207 A1 | 5/2017 | Liu et al. | |
| 2017/0171363 A1 | 6/2017 | Sun et al. | |
| 2017/0171796 A1 | 6/2017 | Wu et al. | |
| 2017/0214507 A1 | 7/2017 | Kang et al. | |
| 2017/0215087 A1 | 7/2017 | Amizur et al. | |
| 2017/0230220 A1 | 8/2017 | Anwyl et al. | |
| 2017/0230981 A1* | 8/2017 | Ryu | H04W 74/00 |
| 2018/0013527 A1* | 1/2018 | Sun | H04L 27/2613 |

FOREIGN PATENT DOCUMENTS

| | | |
|---|---|---|
| WO | 2004049498 | 6/2004 |
| WO | 2010022785 | 3/2010 |
| WO | 2015069811 | 5/2015 |
| WO | 2015077042 | 5/2015 |
| WO | 2016178534 | 11/2016 |
| WO | 2017003229 | 1/2017 |
| WO | 2017027479 | 2/2017 |
| WO | 2017035235 | 3/2017 |

OTHER PUBLICATIONS

EPO, Search Report for the EP Patent Application 15833049.8 dated Feb. 16, 2018 (9 Pages).

International Search Report and Written Opinion of International Search Authority for PCT/CN2015/087365 dated Nov. 24, 2015 (10 Pages).

EPO, Search Report for the EP Patent Application 16191047.6 dated Feb. 14, 2017 (7 Pages).

Young Hoon Kwon, Newracom, SIG Field Design Principle for 11AZ, Doc.: IEEE 802.11-15/0344R2, Mar. 2015 *Slides 5-14*.

EPO, Search Report for the EP Patent Application 16193438.5 dated Mar. 17, 2017 (9 Pages).

EPO, Search Report for the EP Patent Application 16187569.5 Dated Jan. 23, 2017 (12 Pages).

Robert Stacey, Intel, Specification Framework for TGAX, IEEE P802.11 Wireless LANS, Jul. 2015 *p. 3, Line 25-39*, * p. 4, Line 1-5*, *Sections 3.2.2, 3.2.3, 3.3.2, 4.1*.

Katsuo Yunoki, KDDI R&D Laboratories, Considerations on HE-SIG-A/B, Doc.: IEEE 802.11-15/827R2, Jul. 2015 *Slides 2-11*.

Joonsuk Kim, Apple, HE-SIG-B Structure, Doc.: IEEE 802.11-15/0821R2, Jul. 2015 *Slides 8-15*.

Joonsuk Kim, et al., HE-SIG-B Structure, Doc. IEEE 802.11-15/0821R2, Sep. 2015 *Slides 11-15*.

EPO, Search Report for the EP Patent Application 16197315.1 dated Mar. 31, 2017 (8 Pages).

Kaushik Josiam et al., HE-SIG-B Contents, Doc.: IEEE802.11-15/1066R0, Sep. 2015, *Slide 8* *Slides 10, 11* *Slide 17*.

M. Rahaim et al., Wife PHY Standards Review—From Early 802.11 to 'AC' and 'AD', MCL Technical Report No. Apr. 29, 2014.

Robert Stacey, Intel, Specification Framework for TGAX, IEEE P802.11 Wireless LANS, Doc.: IEEE 802.11-15/0132R8, Sep. 2015. *Paragraph [3.2.4]*

Tim Schmidt, "Clause 6 OFSM PHY Draft", Jan. 2010 IEEE P802.15-10-0013-00-004G, IEEE P802.15 Wireless Personal Area Networks, Progect IEEE P802.15 Working Group for Wireless Personal Area Networks (WPANS).

EPO, Search Report for the EP Patent Application 16187569.5 dated Nov. 9, 2017 (6 Pages).

* cited by examiner

| RU size (tones) | BCC with Non DCM modulations | | | BCC with DCM modulation | | |
|---|---|---|---|---|---|---|
| | $N_{col}$ | $N_{row}$ | $N_{rot}$ | $N_{col}$ | $N_{row}$ | $N_{rot}$ |
| 26 | 8 | $3 \times N_{BPSCS}$ | 2 | 4 | $3 \times N_{BPSCS\_half}$ | 2 |
| 52 | 16 | $3 \times N_{BPSCS}$ | 11 | 8 | $3 \times N_{BPSCS\_half}$ | 2 |
| 106 | 17 | $6 \times N_{BPSCS}$ | 29 | 17 | $3 \times N_{BPSCS\_half}$ | 11 |
| 242 | 26 | $9 \times N_{BPSCS}$ | 58 | 13 | $9 \times N_{BPSCS\_half}$ | 29 |
| 484 | - | - | - | - | - | - |
| 996 | - | - | - | - | - | - |

FIG. 7

| RU size (tones) | BCC with DCM + MCS0 | | |
|---|---|---|---|
| | $N_{col}$ | $N_{row}$ | $N_{rot}$ |
| 26 | 4 | 3 | 2 |
| 52 | 8 | 3 | 2 |
| 106 | 17 | 3 | 11 |
| 242 | 13 | 9 | 29 |

— 810

| RU size (tones) | BCC with DCM + MCS1 | | |
|---|---|---|---|
| | $N_{col}$ | $N_{row}$ | $N_{rot}$ |
| 26 | 4 | 6 | 2 |
| 52 | 8 | 6 | 2 |
| 106 | 17 | 6 | 11 |
| 242 | 13 | 18 | 29 |

— 820

| RU size (tones) | BCC with DCM + MCS3/4 | | |
|---|---|---|---|
| | $N_{col}$ | $N_{row}$ | $N_{rot}$ |
| 26 | 4 | 12 | 2 |
| 52 | 8 | 12 | 2 |
| 106 | 17 | 12 | 11 |
| 242 | 13 | 36 | 29 |

| Number of data tones | BCC parameters in 11ac | | | BCC with DCM modulation | | |
|---|---|---|---|---|---|---|
| | $N_{col}$ | $N_{row}$ | $N_{rot}$ | $N_{col}$ | $N_{row}$ | $N_{rot}$ |
| 52 | 13 | $4 \times N_{BPSCS}$ | 11 | 13 | $2 \times N_{BPSCS\_HALF}$ | 2 |

| Number of data tones | BCC parameters in 11ac | | | BCC with DCM modulation | | |
|---|---|---|---|---|---|---|
| | $N_{col}$ | $N_{row}$ | $N_{rot}$ | $N_{col}$ | $N_{row}$ | $N_{rot}$ |
| 52 | 13 | $4 \times N_{BPSCS}$ | 11 | 13 | $4 \times N_{BPSCS\_DCM}$ | 11 |

FIG. 11

INTERLEAVER DESIGN FOR DUAL SUB-CARRIER MODULATION IN WLAN

CROSS REFERENCE TO RELATED APPLICATIONS

This application claims priority under 35 U.S.C. § 119 from U.S. Provisional Application No. 62/268,620, entitled "Interleaver Design for DCM Modulations in 802.11ax," filed on Dec. 17, 2015, the subject matter of which is incorporated herein by reference.

TECHNICAL FIELD

The disclosed embodiments relate generally to wireless network communications, and, more particularly, to interleaver design for dual subcarrier modulation (DCM) in wireless communications systems.

BACKGROUND

IEEE 802.11 is a set of media access control (MAC) and physical layer (PHY) specification for implementing wireless local area network (WLAN) communication in the Wi-Fi (2.4, 3.6, 5, and 60 GHz) frequency bands. The 802.11 family consists of a series of half-duplex over-the-air modulation techniques that use the same basic protocol. The standards and amendments provide the basis for wireless network products using the Wi-Fi frequency bands. For example, IEEE 802.11ac is a wireless networking standard in the IEEE 802.11 family providing high-throughput WLANs on the 5 GHz band. Significant wider channel bandwidths (20 MHz, 40 MHz, 80 MHz, and 160 MHz) were proposed in the IEEE 802.11ac standard. The High Efficiency WLAN study group (HEW SG) is a study group within IEEE 802.11 working group that will consider the improvement of spectrum efficiency to enhance the system throughput in high-density scenarios of wireless devices. Because of HEW SG, TGax (an IEEE task group) was formed and tasked to work on IEEE 802.11ax standard that will become a successor to IEEE 802.11ac. Recently, WLAN has seen exponential growth across organizations in many industries.

Orthogonal Frequency Division Multiple Access (OFDMA) is introduced in HE WLAN to enhance the user experiences by assigning subsets of subcarriers to different users, allowing simultaneous data transmission by several users. In OFDMA, each user is assigned with a group of subcarriers called a resource unit (RU). In HE WLAN, a wireless station (STA) can transmit one minimum size RU (which is about 2 MHz bandwidth) in uplink and downlink OFDMA. Compared to its 20 MHz preamble, the power density of its data portion is 9 dB higher than its preamble. This narrow band uplink OFDMA signal is hard to be detected by CCA because CCA is operated on bandwidth that is greater or equal to 20 MHz. Therefore, one STA can experience 9 dB higher interferences on subcarriers in a particular narrow band than other subcarriers. It can be seen that narrow band interferences are intrinsic in HE WLAN. A scheme to deal with such narrow band interferences is needed.

In Multi-User (MU) transmissions, performance of HE-SIG-B is encoded using 1× symbol duration. As a result, its performance is worse than data symbol with 4× symbol duration when used the same modulation and coding scheme (MCS). A more robust modulation scheme is needed for HE-SIGB. In addition, to extend the range for outdoor scenarios, a new modulation scheme that can operate at lower SNR than MCS0 is also desired. Dual Sub-Carrier Modulation (DCM) modulates the same information on a pair of subcarriers. DCM can introduce frequency diversity into OFDM systems by transmitting the same information on two subcarriers separated in frequency. DCM can be implemented with low complexity and provide better performance than existing modulation schemes used in WLAN. DCM enhances the reliability transmissions, especially under narrow band interferences.

The data field of an HE PPDU can be encoded using either the binary convolutional code (BCC) or the low-density parity check (LDPC) code. The encoder is selected by the Coding field in HE-SIG-A of the HE PPDU. When BCC is applied, the BCC interleaver and de-interleaver for IEEE 802.11ax can reuse the same formulas as IEEE 802.11ac with new values of some of the parameters. For different RU sizes in IEEE 802.11ax, new values are defined for non-DCM modulations. For DCM modulations on the RUs, interleaver parameters may also need to be redefined. In the next generation WLAN system that is based on upcoming IEEE 802.11ax standards, each STA can transmit signals using one or more RU. When DCM is applied for a given RU, a transmission procedure with a new interleaver design for DCM is desired to facilitate the enhanced transmission reliability under DCM.

SUMMARY

A method of interleaver design for dual carrier modulation (DCM) is proposed in a wireless network. For HE PPDU transmission with DCM, information bits are first encoded by a BCC encoder. The BCC encoded bit streams are then interleaved by a BCC interleaver. More specifically, the BCC interleaved bits are repeated on two halves of a given resource unit (RU). The BCC interleaver parameters are defined based on half of the total number of the data tones of the RU if DCM is applied. The BCC interleaved bits are then modulated and mapped to two halves of the RU by a DCM constellation mapper. The modulated symbols are mapped to lower half of the data subcarriers of the RU and duplicated and mapped to the upper half of the data subcarriers of the same RU.

In one embodiment, a source station encodes a data packet to be transmitted to a destination station over a resource unit (RU) in a wireless local area network. The RU has a total number of data tones. The source station interleaves a set of the encoded bits to a set of interleaved bits. The set of encode bits corresponds to half of the total number of data tones of the RU if dual carrier modulation (DCM) is applied. Interleaving parameters are determined based on half of the total number of data tones of the RU. The source station modulates the set of interleaved bits onto a first half of frequency subcarriers of the RU using a first modulation scheme and modulates the set of interleaved bits onto a second half of frequency subcarriers of the RU using a second modulation scheme. The source station transmits the data packet to the destination station.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
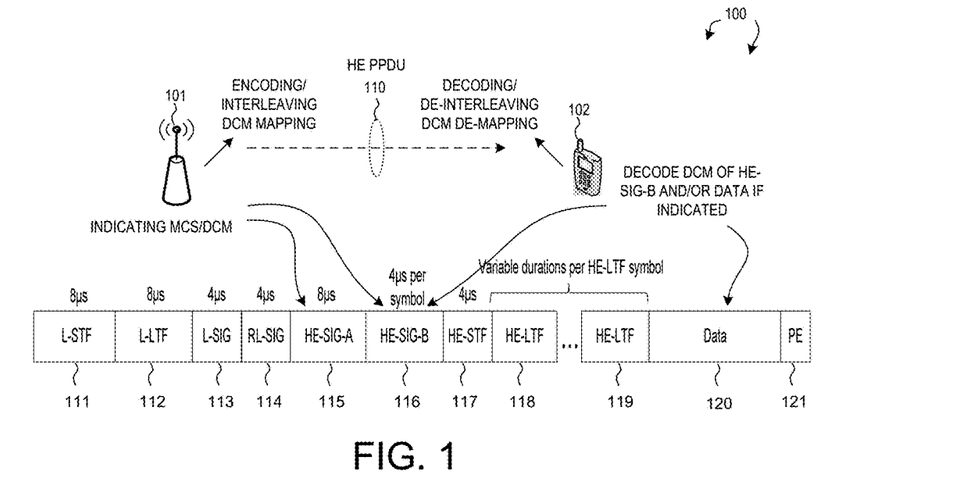
FIG. 1 illustrates a wireless communications system and a high efficiency HE PPDU frame structure supporting DCM transmission using BCC encoding and BCC interleaving in accordance with a novel aspect.

FIG. 1 illustrates a wireless communications system 100 and a high efficiency HE PPDU frame structure supporting dual carrier modulation (DCM) with binary convolutional coding (BCC) in accordance with a novel aspect. Wireless communications network 100 comprises a wireless access point AP 101 and a wireless station STA 102. In wireless communications systems, wireless devices communicate with each other through various well-defined frame structures. A frame comprises a Physical Layer Convergence Procedure (PLCP) Protocol Data Unit (PPDU), a frame header, and a payload. Frames are in turn divided into very specific and standardized sections. In FIG. 1, a high efficiency (HE) PPDU frame 110 is transmitted from AP 101 to STA 102. HE PPDU 110 comprises a legacy short training field (L-STF 111), a legacy long training field (L-LTF 112), a legacy signal field (L-SIG 113), a repeat legacy signal field (RL-SIG 114), a HE signal A field (HE-SIG-A 115), a HE signal B field (HE-SIG-B 116), a HE short training field (HE-STF 117), a HE long training field for data (HE-LTF 118), HE-data payload 120, and a Packet Extension (PE) 121.

Orthogonal Frequency Division Multiple Access (OFDMA) is introduced in HE WLAN to enhance the user experiences by assigning subsets of subcarriers to different users, allowing simultaneous data transmission by several users. In OFDMA, each user is assigned with a group of subcarriers called a resource unit (RU). In HE WLAN, an STA can transmit one minimum size RU (which is about 2 MHz bandwidth) in uplink OFDMA. Compared to its 20 MHz preamble, the power density of its data portion is 9 dB higher than its preamble. This narrow band uplink OFDMA signal is hard to be detected by CCA. Therefore, one STA can experience 9 dB higher interferences on subcarriers in a particular narrow band than other subcarriers. It can be seen that narrow band interferences are intrinsic in HE WLAN. A scheme to deal with the narrow band interferences is thus needed. In addition, under dense deployment, robustness with narrow-band interference is important to HW WLAN. Enhance the PER performance of HE-data portion can extend the range for outdoor scenarios. A new modulation scheme for HE-data that can operate at lower SNR than MCS0 is also desired.

HE-SIG-B is mainly for intended users. In Multi-User (MU) transmissions, performance of HE-SIG-B is encoded using 1× symbol duration. As a result, its performance is worse than data symbol with 4× symbol duration when used the same modulation and coding scheme (MCS). It is shown that extending CP from 0.8 us to 1.6 us or even 3.2 us is not effective in ensuring that SIG-B is reliable relative to data. A more robust modulation scheme is thus needed for HE-SIG-B. HE-SIG-B may contain many bits for OFDMA/MU-MIMO transmissions. Given HE-SIG-B contains the information mainly for intended users, it is OK that not all other STAs receiving HE-SIG-B. The higher the MCS, the higher the efficiency. Therefore, variable MCS should be allowed for HE-SIG-B to enhance the efficiency.

Accordingly, dual sub-carrier modulation (DCM) is introduced in HE WLAN. DCM is a perfect solution to deal with narrow band interferences. DCM can introduce frequency diversity into OFDM systems by transmitting the same information on two subcarriers separated in frequency. For single user transmission, the DCM scheme modulates the same information on a pair of subcarrier n and m, i.e., $0<n<N_{SD}/2$ and $m=N_{SD}/2+n$, where $N_{SD}$ is total number of subcarriers in one resource unit. For OFDMA transmissions, one frequency resource block is assigned to a given user. The DCM scheme for the one frequency block is the same as OFDM case for single user.

A DCM indication scheme can be applied such that encoding and decoding of DCM is really simple. As depicted in FIG. 1, HE SIG-A 115 or HE SIG-B 116 comprises an MCS sub-field indicating the MCS and a DCM bit indicating whether DCM is applied for the subsequent HE SIG-B 116 or subsequent data payload 120 for that user. If DCM is applied and indicated, then the transmitter modulates the same encoded bits on two separated subcarriers with different mapping schemes. Furthermore, a new BCC interleaver can be used when DCM is applied for a given RU. For HE PPDU 110 transmission with DCM, information bits are first encoded by a BCC encoder. The BCC encoded bit streams are then interleaved by a BCC interleaver. More specifically, the BCC interleaved bits are repeated on two halves of a given RU. The BCC interleaver parameters are defined based on half of the total number of the data tones of the RU if DCM is applied. The BCC interleaved bits are then modulated and mapped to two halves of the RU by a DCM constellation mapper.

Figure 2:
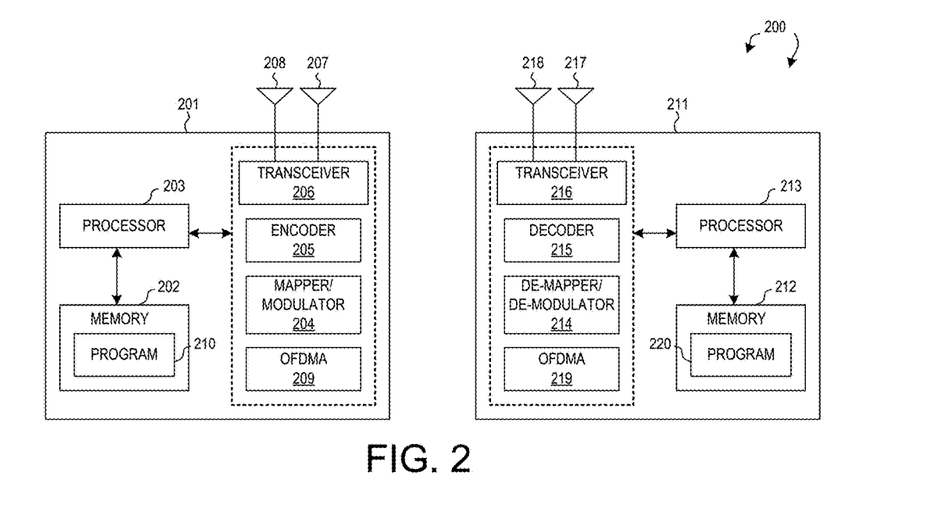
FIG. 2 is a simplified block diagram of a wireless transmitting device and a receiving device in accordance with embodiments of the present invention.

FIG. 2 is a simplified block diagram of wireless devices 201 and 211 in accordance with a novel aspect. For wireless device 201 (e.g., a transmitting device), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a receiving device), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a transmitting device that includes an encoder 205, a symbol mapper/modulator 204, and an OFDMA module 209. Wireless device 211 is a receiving device that includes a decoder 215, a symbol de-mapper/de-modulator 214, and an OFDMA module 219. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow transmitting device 201 and receiving device 211 to perform embodiments of the present invention.

In one example, at the transmitter side, device 201 generates an HE PPDU frame, and inserts both MCS and DCM indication bit in a signal field of the HE PPDU frame. Device 201 then applies corresponding MCS and DCM and transmits the HE PPDU to the receiver. At the receiver side, device 211 receives the HE PPDU, and decodes the MCS and DCM indication bit. If the DCM indication bit is zero, then the receiver calculates the logarithm likelihood ratio (LLR) of a received bit for each subcarrier based on the indicated MCS. On the other hand, if the DCM indication bit is equal to one, then the receiver calculates the LLR by performing LLR combining of the upper subcarrier and the lower subcarrier of the resource unit. Various embodiments of such transmitting device and receiving device are now described below with accompany drawings.

Figure 3:
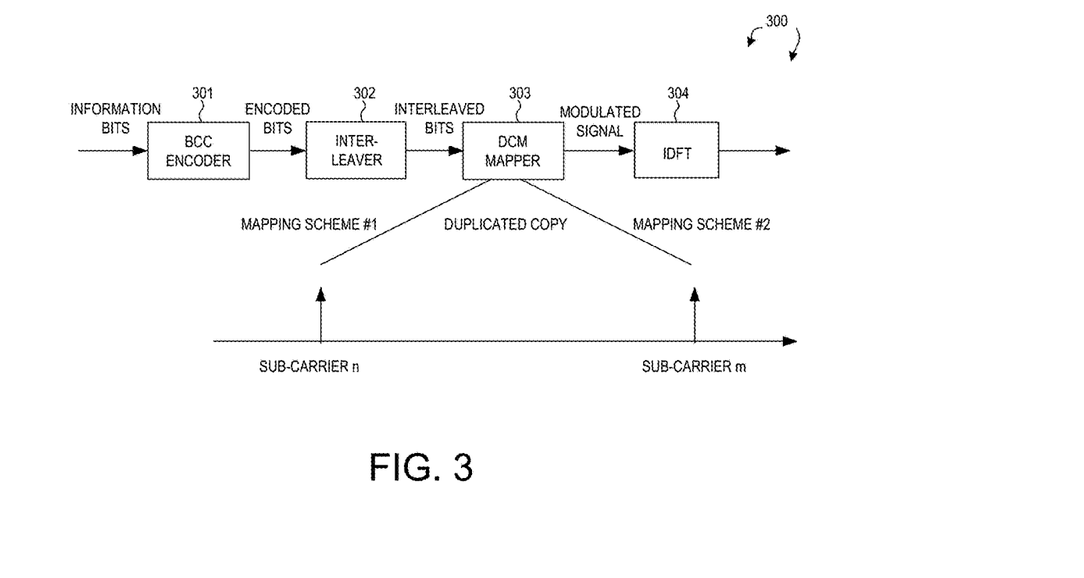
FIG. 3 is a simplified diagram of a transmitting device that applies DCM with BCC encoder followed by interleaver.

FIG. 3 is a simplified diagram of a transmitting device 300 that applies DCM modulation with BCC encoding and interleaving. The information bits are first passed to a BCC encoder 301. The encoded bits of an RU then go through a bit interleaver 302. The interleaved bits are then fed into a DCM mapper 303. DCM mapper 303 modulates the same encoded and interleaved bits on two separate sub-carriers with possibly different mapping schemes. For example, as shown in FIG. 3, subcarrier n and subcarrier m carry the same bit information. Subcarrier n is the lower subcarrier and is applied with mapping scheme #1, subcarrier m is the upper subcarrier and is applied with mapping scheme #2. The modulated signals are then mapped onto data subcarriers of the RU and then fed into IDFT 304 and to be transmitted to a receiver.

Assume the modulated signal for subcarrier n and subcarrier m are denoted as $s_n$ and $s_m$ respectively. For BPSK DCM, $s_n$ and $s_m$ can be obtained by mapping a 1-bit interleaved bit $b_0$ on two identical or different BPSK constellation (e.g., BPSK and SBPSK). For QPSK DCM, $s_n$ and $s_m$ can be obtained by mapping a 2-bit stream $b_0$ $b_1$ on two identical or different QPSK constellation. For example, $s_n$ can be mapped using QPSK and $s_m$ can be mapped using staggered quadrature phase-shift keying (SQPSK) or other rotated QPSK schemes, respectively. For 16QAM DCM, $s_n$ and $s_m$ are obtained by mapping a 4-bit stream $b_0b_1b_2b_3$ on two different 16QAM constellation respectively.

Figure 4:
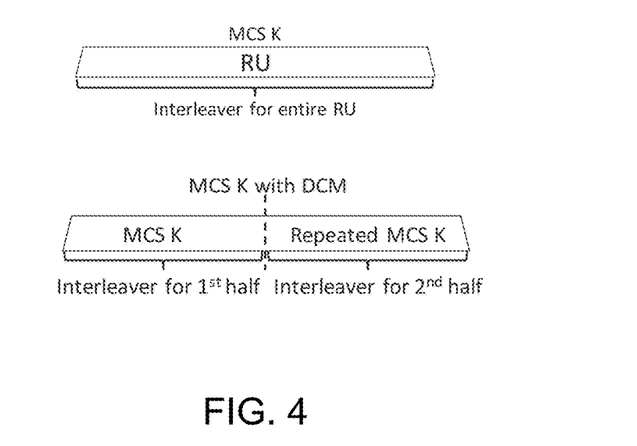
FIG. 4 illustrates the difference between BCC interleavers for a given resource unit (RU) with and without DCM modulation.

FIG. 4 illustrates the difference between BCC interleavers for a given resource unit (RU) with and without DCM modulation. In general, the BCC interleaver and de-interleaver for IEEE 802.11ax can reuse the same formulas as IEEE 802.11ac with new values for parameters $N_{COL}$, $N_{ROW}$, and $N_{ROT}$. For different RU size in IEEE 8i02.11ax, new values are defined for non-DCM modulations. For DCM modulations on the RUs, interleaver parameters also need to be redefined. For non-DCM modulations, encoded bits are interleaved for the entire RU (as depicted in top diagram of FIG. 4). For DCM modulations, encoded bits are repeated on two halves of the RU, and interleaver shall be applied on encoded bits for half of the RU (as depicted in bottom diagram of FIG. 4).

Figure 5:
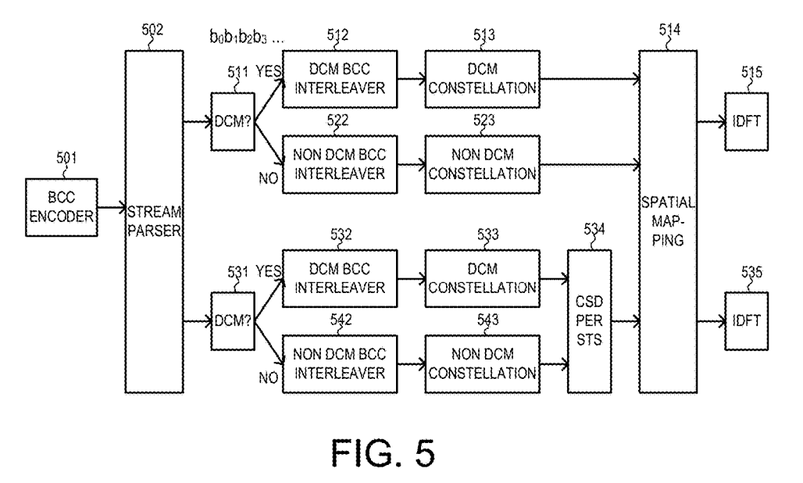
FIG. 5 illustrates a transmission procedure of DCM using BCC encoding and BCC interleaving.

FIG. 5 illustrates a transmission procedure of DCM using BCC encoding and BCC interleaving. A transmitter of a wireless device comprises a BCC encoder 501, a stream parser 502, selectors 511/531, BCC interleavers 512/532 for DCM, DCM constellation mappers 513/533, BCC interleavers 522/542 for non-DCM, non-DCM constellation mappers 523/543, a cyclic shift delay (CSD) circuit 534 per stream, a spatial mapper 514, and Inverse Discrete Fourier Transform (IDFT) circuits 515/535. BCC encoder 501 encodes data information into a long bit stream, which is parsed by stream parser 502 into multiple bit streams. Each bit stream is then interleaved and modulated and mapped onto data subcarriers of a corresponding RU. For example, if DCM is applied, then each bit stream ($b_0b_1b_2b_3$ ...) is interleaved by BCC interleaver 512, modulated by DCM constellation mapper 513, which is further mapped by spatial mapper 514, and passed to IDFT 515 to be transmitted out. On the other hand, if DCM is not applied, then each bit stream ($b_0b_1b_2b_3$ ...) is interleaved by BCC interleaver 522, modulated by non-DCM constellation mapper 523, which is further mapped by spatial mapper 514, and passed to IDFT 515 to be transmitted out.

Figure 6:
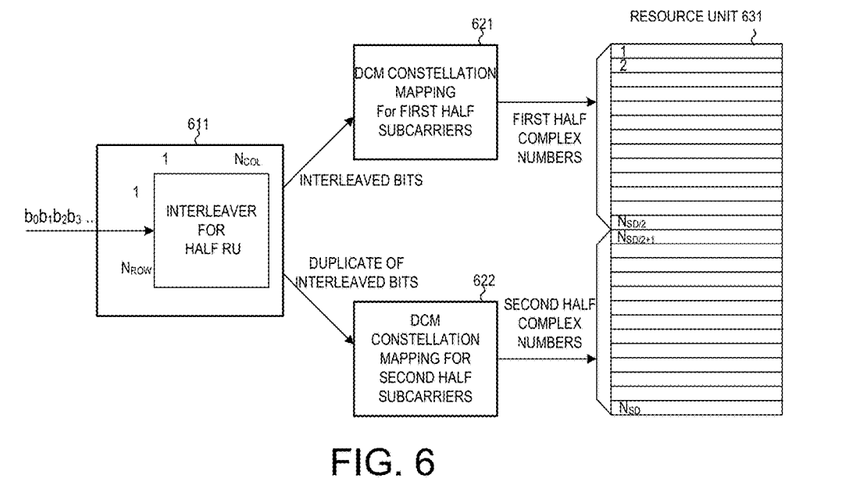
FIG. 6 illustrates one example of BCC interleaving when DCM is applied for a given RU.

FIG. 6 illustrates one example of BCC interleaving when DCM is applied for a given resource unit (RU). In IEEE 802.11ac wireless networks, for a 20 MHz, 40 MHz, or 80 MHz PPDU transmission, the encoded bits at the output of the stream parser are processed in groups of $N_{CBPS}$ (number of coded bits per OFDM symbol) bits. Each of these groups is divided into $N_{SS}$ (number of spatial streams) blocks of $N_{CBPSS}$ (number of coded bits per OFDM symbol per spatial stream) bits and each block shall be interleaved by an interleaver defined by the specification. In general, the interleaver is based on entering the data bits in rows, and reading it out in columns. Therefore, the interleaver has a different number of columns $N_{COL}$ and number of rows $N_{ROW}$ for different bandwidths. For a given RU size, the number of data tones=$(N_{COL}*N_{ROW})/N_{BPSCS}$, where $N_{ROW}$ further depends on the value of $N_{BPSCS}$ (number of coded bits per single carrier for each spatial stream). Under DCM modulation, a BCC interleaver is designed for half RU based on the number of data tones on half RU. $N_{BPSCS\_HALF}$ of half RU is the same as $N_{BPSCS}$ of one RU for non-DCM modulation of the same modulation and coding scheme (MCS) level.

In the example of FIG. 6, BCC-encoded bit streams, $b_0b_1b_2b_3$ ..., are interleaved by interleaver 611 and then mapped by DCM constellation mappers 621 and 622 onto a resource unit RU 631. Let $N_{SD}$ be the number of data subcarriers in one resource Unit (RU). For a BCC-encoded bit stream, $b_0b_1b_2b_3 \ldots$, when DCM modulation is used, then interleaver 611 performs interleaving for the encoded bits based on half RU, e.g., $(N_{COL}*N_{ROW})/N_{BPSCS}=N_{SD}/2$. The interleaved bits for the first half RU are modulated to first half of complex numbers and mapped by DCM 621 to the lower half of the data subcarriers $[1, 2, \ldots N_{SD/2}]$ of the RU. The interleaved bits are duplicated for the second half RU and are modulated to second half of complex numbers and mapped by DCM 622 to the upper half of the data subcarriers $[N_{SD/2+1}, N_{SD/2+1}, \ldots N_{SD}]$ of the RU.

In the next generation WLAN system that is based on upcoming IEEE 801.11ax standards, each station (STA) can transmit signals using one or more resource units (RU). The RU size can be 26, 52, 106, 242, 484, or 996 tones with tone spacing of about 78.1 kHz. Correspondingly, the number of data tones $N_{SD}$ for each RU is 24, 48, 102, 234, 468, and 980, respectively. When DCM is applied for a given RU, the number of complex numbers generated using DCM of a given stream is the half of the number of data tones of the RU, i.e., $N_{SD}/2$. For example, if the RU size is 102, then the number of complex number generated using DCM is $N_{SD}/2=51$. The generated complex numbers will be mapped to data tones of the first half and the data tones of the second half of the frequency segments of the RU. The first half frequency segment of a RU contains tones 1 to $N_{SD}/2$, and the second half frequency segment of a RU contains tones $N_{SD}/2$ to tones $N_{SD}$, where $N_{SD}$ is the RU size.

The two frequency subcarriers used for DCM can be pre-determined. For example, for single user transmission, DCM modulation can be applied to subcarrier k and k+N/2, where N is the total number of subcarriers in one OFDM symbol or RU. For OFDMA transmission, DCM modulation can be applied to two equal frequency resource blocks assigned to a given user. The transmission method of using DCM can be implemented even with interferences presented in one frequency band or frequency resource block. For example, for non-WiFi signals or OBSS signals, different clear channel assessment (CCA) threshold can be applied for two frequency bands.

Figure 7:
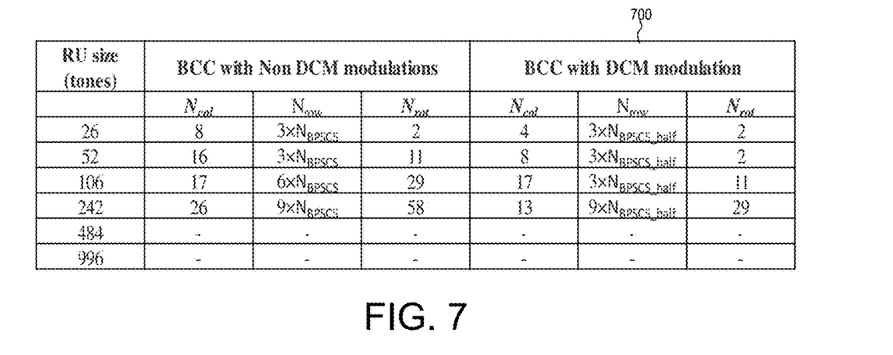
FIG. 7 illustrates one embodiment of BCC interleaver design for both BCC with non-DCM modulation and BCC with DCM modulation.

FIG. 7 illustrates one embodiment of BCC interleaver design for both BCC with non-DCM modulation and BCC with DCM modulation. Table 700 depicts different RU sizes (tones) of 26, 52, 106, 242, 484, and 996. For BCC with non-DCM modulations, the BCC interleaver parameters $N_{COL}$ and $N_{ROW}$ are predefined for each RU size based on the number of data subcarriers $N_{SD}$ of the RU. For BCC with DCM modulations, the BCC interleaver parameters $N_{COL}$ and $N_{ROW}$ are predefined for each half RU size based on the number of data subcarriers $N_{SD}/2$ of the RU. For example, for RU size 26, 52, and 242, the $N_{COL}$ for BCC with DCM modulation is half of the $N_{COL}$ for BCC with non-DCM modulation. For RU size 106, the $N_{ROW}$ for BCC with DCM modulation is half of the $N_{ROW}$ for BCC with non-DCM modulation. Note that the value of $N_{BPSCS\_HALF}$ for half RU is the same as the value of $N_{BPSCS}$ for non-DCM modulation of the same modulation and coding scheme (MCS) level. As a result, the $N_{COL}$ values for a given RU size are 4, 8, 17, and 13 for RU sizes 26, 52, 106 and 242 respectively. The $N_{ROW}$ values for a given RU are $3*N_{BPSCS\_HALF}$, $3*N_{BPSCS\_HALF}$, $3*N_{BPSCS\_HALF}$ and $9*N_{BPSCS\_HALF}$ for RU sizes 26, 52, 106 and 242 respectively.

Figure 8:
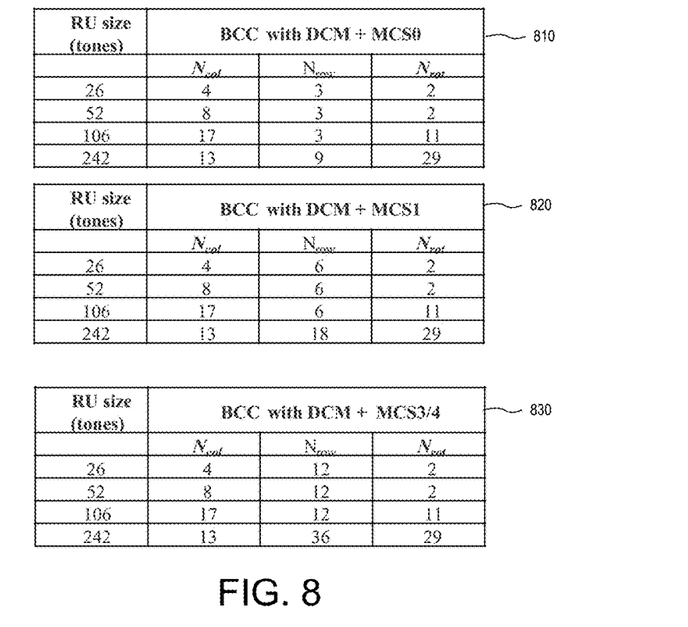
FIG. 8 illustrates examples of BCC interleaver design for BCC with DCM modulation under different MCS.

FIG. 8 illustrates examples of BCC interleaver design for BCC with DCM modulation under different MCS levels. The $N_{COL}$ values for a given RU size under different MCS levels remain the same for all MCS levels, which are 4, 8, 17, and 13 for RU sizes 26, 52, 106 and 242 respectively. The $N_{ROW}$ values for a given RU under different MCS levels depend on the corresponding $N_{BPSCS}$ value associated with the MCS level, which are $3*N_{BPSCS}$, $3*N_{BPSCS}$, $3*N_{BPSCS}$ and $9*N_{BPSCS}$ for RU sizes 26, 52, 106 and 242 respectively. Table 810 depicts BCC interleaver design for BCC with DCM modulation under MCS0 (BPSK, ½). As depicted in Table 810, for MCS0, $N_{BPSCS}=1$. The $N_{ROW}$ values equal to 3, 3, 3, and 9 for RU sizes 26, 52, 106 and 242 respectively. Table 820 depicts BCC interleaver design for BCC with DCM modulation under MCS1 (QPSK, ½). As depicted in Table 820, for MCS1, $N_{BPSCS}=2$. The $N_{ROW}$ values equal to 6, 6, 6, and 18 for RU sizes 26, 52, 106 and 242 respectively. Table 830 depicts BCC interleaver design for BCC with DCM modulation under MCS3&4 (16QAM, ½, 16QAM, ¾). As depicted in Table 830, for MCS3&4, $N_{BPSCS}=4$. The $N_{ROW}$ values equal to 12, 12, 12 and 36 for RU sizes 26, 52, 106 and 242 respectively.

Figure 9:
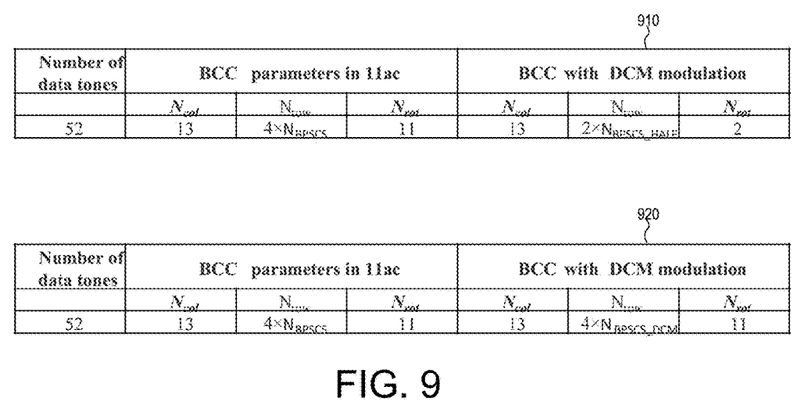
FIG. 9 illustrates one embodiment of BCC interleaver design for HE SIG-B with DCM modulation.

FIG. 9 illustrates one embodiment of BCC interleaver design for HE SIG-B with DCM modulation. For HE SIG-B field, it occupies 1×OFDM symbol length and the number of data tones is 52. The HE SIG-B field can also be applied with DCM modulation, as indicated by the HE SIG-A field of the HE PPDU. In a first option, the BBC interleaver parameters for HE SIG-B can be defined based on half band (e.g., 26 data tones). As depicted in Table 910, under non-DCM modulation, $N_{COL}=13$, $N_{ROW}=4*N_{BPSCS}$. Under DCM modulation, $N_{COL}=13$, $N_{ROW}=2N_{BPSCS\_HALF}$. Note that $N_{BPSCS\_HALF}$ under option 1 is the same as $N_{BPSCS}$ for non-DCM modulation of the same level. In a second option, the BBC interleaver parameters for HE SIG-B can reuse IEEE 802.11ac interleaver parameters for 20 MHz data. As depicted in Table 920, under non-DCM modulation, $N_{COL}=13$, $N_{ROW}=4*N_{BPSCS}$. Under DCM modulation, $N_{COL}=13$, $N_{ROW}4*N_{BPSCS\_DCM}$, however, the $N_{BPSCS\_DCM}$ under option 2 is $(½)*N_{BPSCS}$ for non-DCM modulation of the same level.

Figure 10:
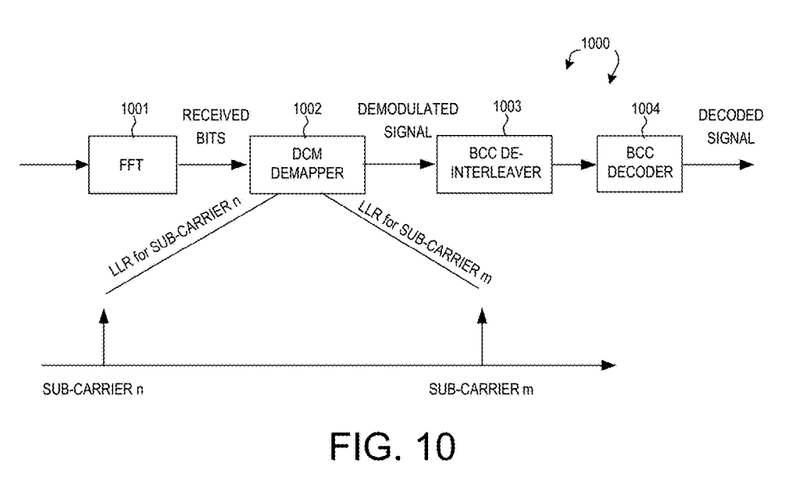
FIG. 10 is a simplified diagram of a receiving device that applies DCM de-modulation with BCC de-interleaving and BCC decoding.

FIG. 10 is a simplified diagram of a receiving device 1000 that applies DCM de-modulation with LDPC de-mapping. At the receiver, the received signal through FFT 1001 can be written as:

$$r_n=h_ns_n+v_n$$

Upper subcarrier $$r_m=h_ms_m+v_m$$

Lower subcarrier
Where $h_n$ and $h_m$ are channel response matrixes for subcarriers n and m $v_n$ and $v_m$ are modeled as AWGN noise The DCM de-mapper/demodulator 1002 of the receiver can calculate the logarithm likelihood ratio (LLR) of a received bit by combining the received signals from the upper subcarrier and the lower subcarrier if the SNR is considered "good" for the upper and lower subcarriers. Alternatively, the receiver can choose to calculate the LLR of a received bit just from the upper subcarrier or from the lower subcarrier if the SNR is considered "bad" for the lower or the upper subcarriers, respectively. The demodulated signal is then fed to BCC de-interleaver 1003 and then decoded by BCC decoder 1004 for outputting the decoded signal.

There are many advantages of using DCM. No latency is added for modulation within one OFDM symbol. No extra complexity is introduced at modulator and demodulator. For modulation, no extra complexity, just modulate the subcarriers in the upper band and the subcarriers in lower band the similar way. For demodulation, LLR calculation is really simple. For QPSK, just add two LLRs. For 16QAM, just need a few simple additional subtractions. Simulation results show that PER performance improve more than 2 dB gain for MCS0 and MCS2 in 4x symbol. Such performance gain is significant. For wider bandwidth (>20 MHz), larger performance gain can be expected due to larger frequency diversity gain. Error floor is also reduced for outdoor channels. Overall, the DCM scheme results in more robustness to sub-band interferences and provides a very good data rate vs. PER tradeoff between QPSK ½ rate code and 16QAM ½ rate code.

Figure 11:
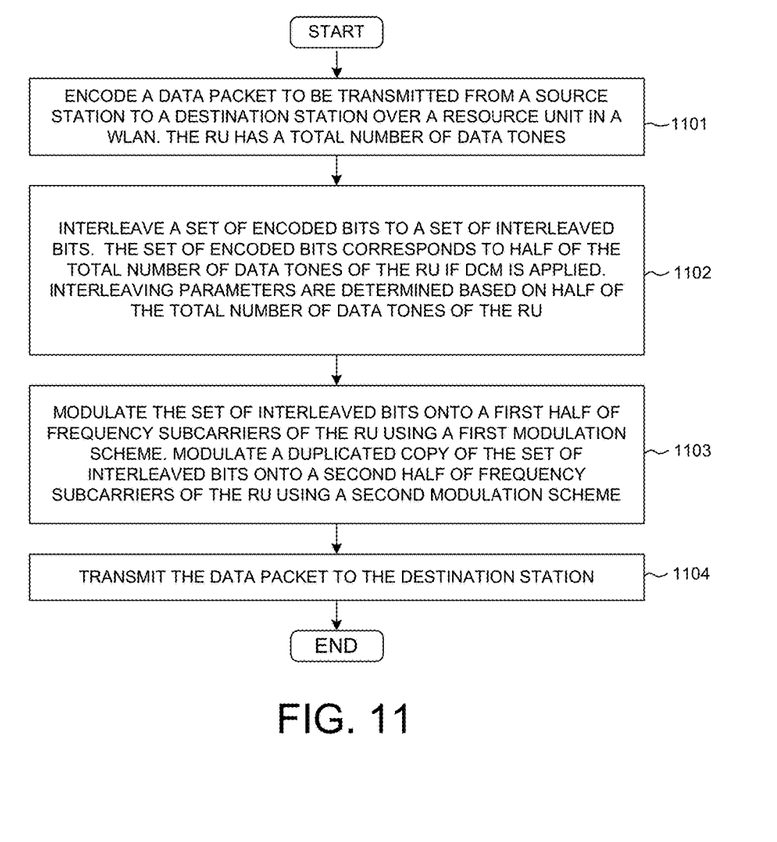
FIG. 11 is flow chart of a method of transmitting and encoding a HE PPDU frame with DCM using BCC interleaver in accordance with a novel aspect.

FIG. 11 is flow chart of a method of transmitting and encoding a HE PPDU frame with DCM using BCC interleaver in accordance with a novel aspect. In step 1101, a source station encodes a data packet to be transmitted to a destination station over a resource unit (RU) in a wireless local area network. The RU has a total number of data tones. In step 1102, the source station interleaves a set of the encoded bits to a set of interleaved bits and interleaves. The set of encode bits corresponds to half of total number of data tones of the RU if dual carrier modulation (DCM) is applied. Interleaving parameters are determined based on half of the total number of data tones of the RU. In step 1103, the source station modulates the set of interleaved bits onto a first half of frequency subcarriers of the RU using a first modulation scheme and modulates a duplicated copy of the set of interleaved bits onto a second half of frequency subcarriers of the RU using a second modulation scheme. In step 1104, the source station transmits the data packet to the destination station.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   encoding a data packet to be transmitted from a source station to a destination station over a resource unit (RU) in a wireless local area network to generate encoded bits, wherein the data packet comprises a bit to indicate to use dual carrier modulation (DCM), wherein the RU comprises a total number of data tones;
   interleaving a set of the encoded bits to produce a set of interleaved bits by using interleaving parameters, wherein said interleaving comprises, in response to the bit indicating to use the DCM, determining the interleaving parameters based on half of the total number of data tones of the RU, wherein the set of the encoded bits is interleaved with respect to half of the total number of data tones of the RU in response to the bit indicating to use the DCM;
   modulating the set of interleaved bits to generate a modulated output, wherein said modulating comprises, in response to the bit indicating to use the DCM, modulating the set of interleaved bits onto a first half of frequency subcarriers of the RU using a first modulation scheme, and modulating a copy of the set of interleaved bits onto a second half of frequency subcarriers of the RU using a second modulation scheme; and
   transmitting the modulated output that represents the data packet for receipt by the destination station.

2. The method of claim 1, wherein the first modulation scheme and the second modulation scheme are based on same modulation level.

3. The method of claim 1, wherein the interleaving parameters comprise a column number, a row number, and a rotation number, wherein the interleaving parameters are determined based on half of the total number of data tones of the RU in response to the bit indicating to use the DCM.

4. The method of claim 3, wherein a product of the column number and the row number equals to a number of the encoded bits on half of the total number of data tones of the RU.

5. The method of claim 3, wherein the column number is predefined for each RU with a corresponding total number of data tones.

6. The method of claim 3, wherein the row number is related to a number of coded bits per single carrier for each spatial stream ($N_{BPSCS}$).

7. The method of claim 6, wherein the $N_{BPSCS}$ is associated with a corresponding modulation level applied for the RU.

8. The method of claim 1, wherein the data packet comprises a high efficiency (HE) SIG-B field, wherein the encoded HE SIG-B field is interleaved based on half of a total number of data tones allocated for the HE-SIG-B field in response to the bit indicating to use the DCM.

9. The method of claim 1, further comprising:
   determining whether the bit indicates to use the DCM; and
   in response to the bit not indicating to use the DCM, performing non-DCM interleaving and modulation.

10. The method of claim 9, wherein the performing non-DCM interleaving is performed on the set of the encoded bits for the entire RU, and wherein the interleaving parameters for the non-DCM interleaving are determined based on the total number of data tones of the RU.

11. A wireless station, comprising:
   an encoder operable to encodes a data packet to be transmitted from a source station to a destination station over a resource unit (RU) in a wireless local area network to generate encoded bits, wherein the data packet comprises a bit to indicate to use dual carrier modulation (DCM), wherein the RU comprises a total number of data tones;
   an interleaver operable to interleaves a set of the encoded bits to produce a set of interleaved bits by using interleaving parameters, wherein in response to the bit indicating to use the DCM, the interleaver is operable to determine the interleaving parameters based on half of the total number of data tones of the RU, wherein the set of the encoded bits is interleaved with respect to half of the total number of data tones of the RU in response to the bit indicating to use the DCM;
   a modulator operable to modulate the set of interleaved bits to generate a modulated output, wherein in response to the bit indicating to use the DCM, the modulator is operable to modulates the set of interleaved bits onto a first half of frequency subcarriers of the RU using a first modulation scheme; and is operable to modulate a copy of the set of interleaved bits onto a second half of frequency subcarriers of the RU using a second modulation scheme; and
   a transmitter operable to transmit the modulated output that represents the data packet for receipt by the destination station.

12. The wireless station of claim 11, wherein the first modulation scheme and the second modulation scheme are based on same modulation level.

13. The wireless station of claim 11, wherein the interleaving parameters comprise a column number, a row number, and a rotation number, wherein the interleaving parameters are determined based on half of the total number of data tones of the RU in response to the bit indicating to use the DCM.

14. The wireless station of claim 13, wherein a product of the column number and the row number equals to a number of the encoded bits on half of the total number of data tones of the RU.

15. The wireless station of claim 13, wherein the column number is predefined for each RU with a corresponding total number of data tones.

16. The wireless station of claim 13, wherein the row number is related to a number of coded bits per single carrier for each spatial stream ($N_{BPSCS}$).

17. The wireless station of claim 16, wherein the $N_{BPSCS}$ is associated with a corresponding modulation level applied for the RU.

18. The wireless station of claim 11, wherein the data packet comprises a high efficiency (HE) SIG-B field, wherein the encoded HE SIG-B field is interleaved based on half of a total number of data tones allocated for the HE-SIG-B field in response to the bit indicating to use the DCM.

19. The wireless station of claim 11, further comprising a unit operable to determine whether the bit indicates to use the DCM, wherein in response to the bit not indicating to use the DCM, the interleaver and the modulator are operable to perform non-DCM interleaving and modulation.

20. The wireless station of claim 19, wherein the interleaver is operable to perform the non-DCM interleaving on the set of the encoded bits for the entire RU, and wherein the interleaving parameters for the non-DCM interleaving are determined based on the total number of data tones of the RU.

* * * * *